United States Patent [19]

Johnson et al.

[11] Patent Number: 5,305,532
[45] Date of Patent: Apr. 26, 1994

[54] SIDING ALIGNMENT TOOL

[76] Inventors: Joel T. Johnson, 34 Main St.; Sharon L. Johnson, P.O. Box 292, both of Kingston, N.H. 03848

[21] Appl. No.: 48,305

[22] Filed: Apr. 19, 1993

[51] Int. Cl.$^5$ ................................................. G01B 5/14
[52] U.S. Cl. ...................................... 33/647; 33/411; 33/482; 33/666; 33/18.1
[58] Field of Search ............... 33/646, 647, 648, 649, 33/411, 573, 18.1, 482, 666, 668, 567

[56] References Cited

U.S. PATENT DOCUMENTS

| 155,113 | 9/1874 | Slawson | 33/647 |
| 334,363 | 1/1886 | Ervin | 33/647 |
| 351,722 | 10/1886 | Trueblood | 33/647 |
| 774,114 | 11/1904 | Spear | 33/411 |

Primary Examiner—William A. Cuchlinski, Jr.
Assistant Examiner—Alvin Wirthlin
Attorney, Agent, or Firm—Leon Gilden

[57] ABSTRACT

A gauge member arranged to include first and second planar side walls arranged in a parallel coextensive relationship having a first end wall spaced from a second end wall having a first step therebetween, a second step is positioned at an uppermost end of the second end wall parallel to the first step. The first step and second step are spaced apart a predetermined spacing, with a third end wall and a fourth end wall spaced from and parallel relative to one another at an opposed end of the body structure, the third and fourth steps are spaced apart a further spacing greater than the predetermined spacing, the first and second steps are arranged to position and engage overlapping siding plates, the third and fourth steps are also arranged to engage overlapping siding steps at a greater spacing relative to one another.

3 Claims, 4 Drawing Sheets

SIDING ALIGNMENT TOOL

BACKGROUND OF THE INVENTION

1. Field of the Invention

The field of invention relates to siding apparatus, and more particularly pertains to a new and improved siding alignment tool arranged to gauge spacing between lowermost ends of overlapped siding or shingle members.

2. Description of the Prior Art

The instant invention is arranged to overcome deficiencies in the prior art that have heretofore failed to provide for convenient gauge structure arranged to permit the gauging and overlapping of shingle members spaced relative to one another in a vertical orientation and in this respect, the present invention substantially fulfills this need.

SUMMARY OF THE INVENTION

In view of the prior art, the present invention provides a siding alignment tool wherein the same is directed to the gauging and spacing of shingle members relative to one another. As such, the general purpose of the present invention, which will be described subsequently in greater detail, is to provide a new and improved siding alignment tool which has all the advantages of the prior art gauge apparatus and none of the disadvantages.

To attain this, the present invention provides a gauge member arranged to include first and second planar side walls arranged in a parallel coextensive relationship having a first end wall spaced from a second end wall having a first step therebetween, wherein a second step is positioned at an uppermost end of the second end wall parallel to the first step. The first step and second step are spaced apart a predetermined spacing, with a third end wall and a fourth end wall spaced from and parallel relative to one another at an opposed end of the body structure, wherein the third and fourth steps are spaced apart a further spacing greater than said predetermined spacing, wherein the first and second steps are arranged to position and engage overlapping of siding plates, wherein the third and fourth steps are also arranged to engage overlapping of siding steps at a greater spacing relative to one another.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved siding alignment tool which has all the advantages of the prior art gauge apparatus and none of the disadvantages.

It is another object of the present invention to provide a new and improved siding alignment tool which may be easily and efficiently manufactured and marketed.

It is a further object of the present invention to provide a new and improved siding alignment tool which is of a durable and reliable construction.

An even further object of the present invention is to provide a new and improved siding alignment tool which is susceptible of a low cost of manufacture with regard to both materials and labor, and which accordingly is then susceptible of low prices of sale to the consuming public, thereby making such siding alignment tools economically available to the buying public.

These together with other objects of the invention, along with the various features of novelty which characterize the invention, are pointed out with particularly in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
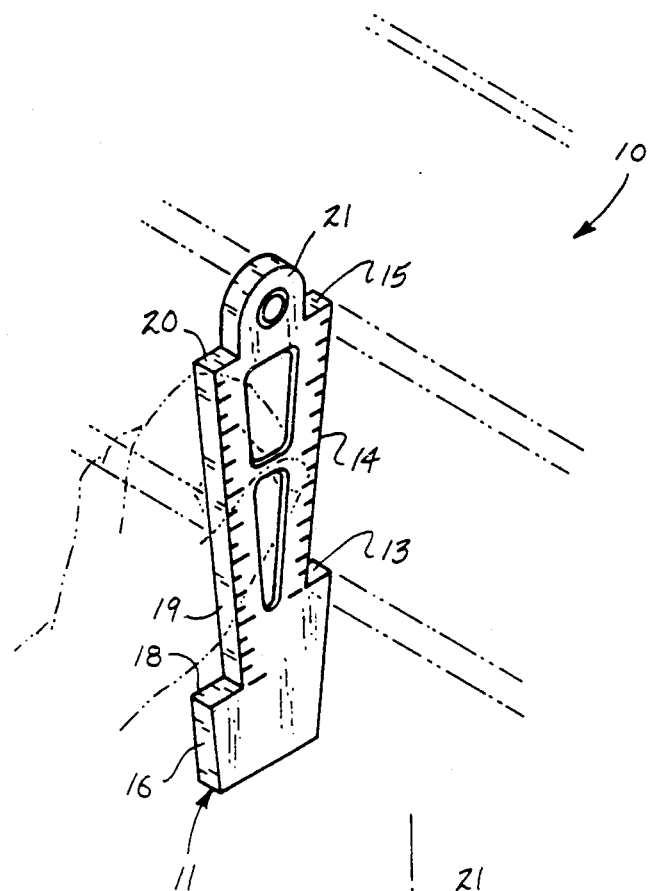
FIG. 1 is an isometric illustration of the invention in use.

With reference now to the drawings, and in particular to FIGS. 1 to 8 thereof, a new and improved siding alignment tool embodying the principles and concepts of the present invention and generally designated by the reference numerals 10 and 10a will be described.

Figure 2:
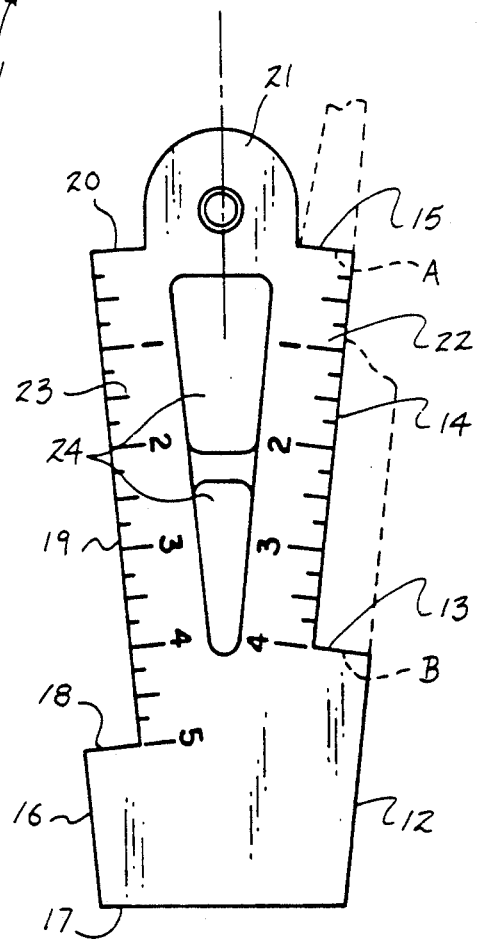
FIG. 2 is an orthographic frontal view of the invention.

More specifically, the siding alignment tool 10 of the invention, as indicated in the FIGS. 1 and 2, is arranged to measure appropriate spacings between respective first and second shingle bases "A" and "B", as indicated. The tool structure includes a tool plate body 11, having spaced first and second side walls 25 and 26 (see FIG. 3) that are in a coextensive relationship, wherein a first end wall 12 extends from a body bottom end wall 17 at an obtuse included angle terminating at an intersection orthogonally with a first step flange 13. The second end wall 14 extends from the first step flange 13 orthogonally relative to the first step flange 13 and in a spaced parallel relationship relative to the first end wall 12, with the second end wall 14 terminating in a second step flange 15 that in turn is parallel and offset relative to the first step flange 13. A third end wall 16 extends at an obtuse included angle relative to the bottom end wall 17, wherein the third end wall 16 is oriented at substantially an acute angle relative to the first end wall 12. The third end wall 16 extends from the body bottom end wall 17 to a third step flange 18 that is orthogonally arranged to intersect an upper distal end of the third end wall 16. A fourth end wall 19 extends in a parallel spaced relationship relative to the third end wall 16 and orthogonal relative to the third step flange 18 terminating in a fourth step flange 20 at an uppermost distal end of the fourth end wall 19. A head plate 21 is oriented coextensively between the fourth step flange 20 and the second step flange 15 utilizing a mounting aperture, as indicated, for permitting suspension of the organization when not in use. A first graduated scale 22 extends from the second step flange 15 to the first step flange 13, with a second graduated scale 23 of a greater dimension than the first graduated scale extends from the fourth step flange 20 to the third step flange 18. Central body recesses 24 are directed into the first and second side walls 25 and 26 to enhance ease of manual grasping of the tool plate body 11 as the recesses 24 are oriented between the first and second graduated scales 22 and 23 to not obstruct visually their utilization in measuring between the shingle bases "A" and "B". The first graduated scale of a first length less than the second length of the second graduated scale is arranged to provide for a multiple of spacings of various shingle lengths.

Figure 3:
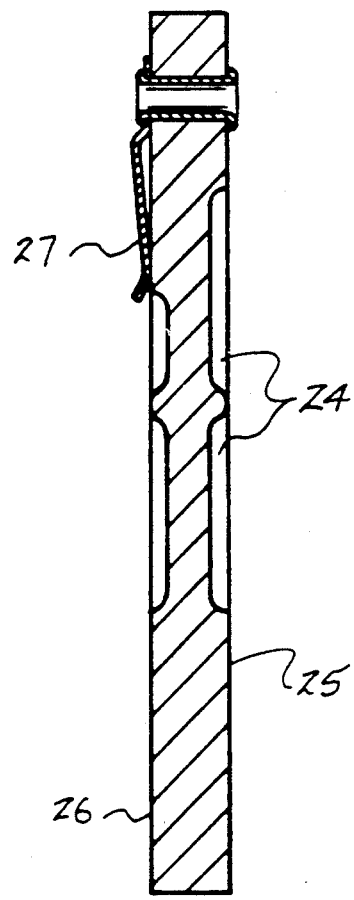
FIG. 3 is an orthographic partial side view of the invention.
Figure 4:
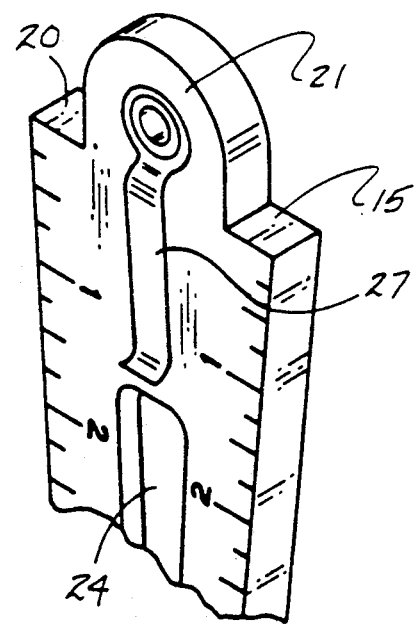
FIG. 4 is an isometric illustration of the invention indicating the use of a mounting clip structure.

The FIGS. 3 and 4 indicate the use of a spring clip member 27 mounted to the aperture and medially of the head plate 21 for garment support of the organization during its transport, such as in an individual's pocket.

Figure 5:
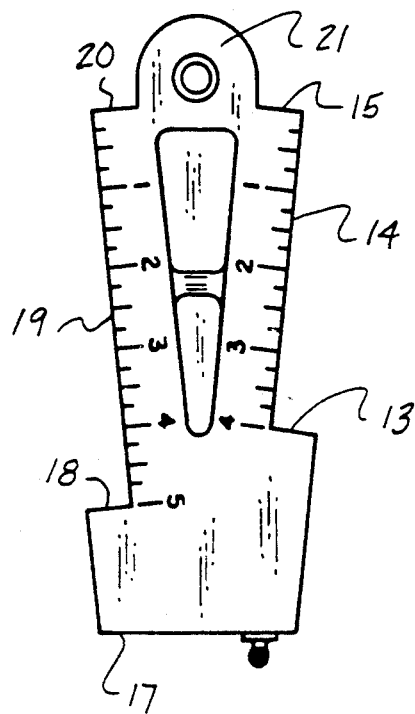
FIG. 5 is an orthographic view of the invention indicating the removable scribe member mounted through the bottom wall of the plate body.
Figure 6:
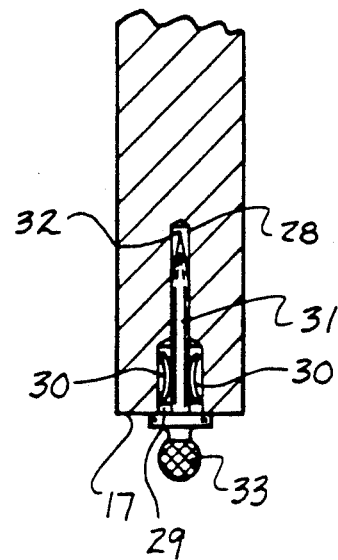
FIG. 6 is an enlarged orthographic view of the scribing tool received in the tool body.

The FIGS. 5 and 6 indicate the use of an additional scribing member, having a scribe body 31 longitudinally aligned terminating in a projecting point 32 at a first end of the scribe body 31, with the second end of the scribe body having a scribe body head 33 for abutment with the body bottom end wall 17, wherein the scribe body 31 is directed into a bottom end wall cavity 28 through a cavity entrance 29. Facing spring plates 30 mounted within the cavity 28 in adjacency to the entrance 29 permit biased securement of the scribe body 31 when directed into the bottom wall cavity 28. The scribe member is arranged to indicate and scribe marks and indicia onto a workpiece when the workpiece is in abutment with the shingles to indicate excessive or deficient overlapping and permitting scribing of proper desired spacing of exposed shingle surfaces.

Figure 7:
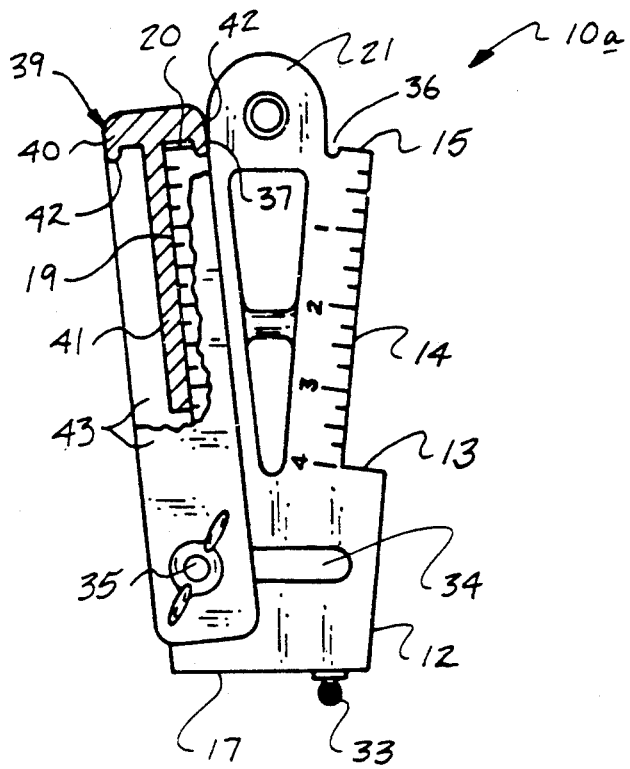
FIG. 7 is an isometric illustration of a modified aspect of the invention including a removable handle.
Figure 8:
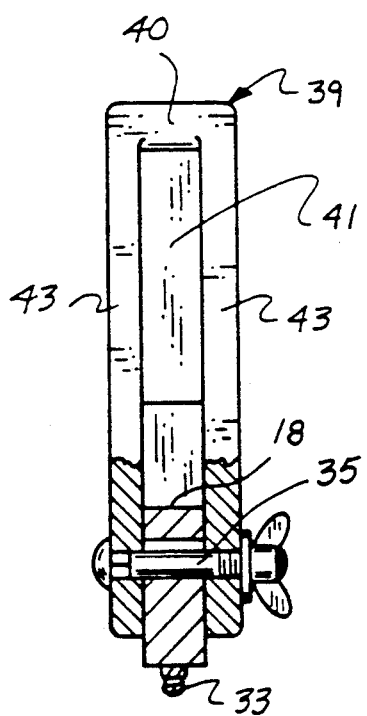
FIG. 8 is an orthographic rear view, partially in section, of the handle member.

The invention 10a as indicated in FIGS. 7 and 8 indicate the use of an optional handle body 39 for mounting along selectively the first and second end walls or the third and fourth end walls. To this end, respective first and second recesses 36 and 37 are directed into the body between the first and second side walls at intersections of the head plate with the respective second step flange 15 and the fourth step flange 20. Arranged for projection into a first or second recess 36 or 37 is the use of a top flange 40 of the handle body 39, having abutment flanges 42 directed from the top flange 40 for reception within one of the first and second recesses 36 or 37. Orthogonally and medially mounted from the top flange 40 is an abutment flange 41. Spaced handle side walls 43 oriented orthogonally on opposed sides of the abutment flange 41 are of a predetermined spacing equal to a predetermined width between the first and second side walls of the tool plate body 11, with the abutment flange 41 arranged for abutting a respective second end wall 14 or, as illustrated in FIG. 7, a fourth end wall 19. The handle side walls 43 extend to receive a fastener rod 35 orthogonally between the handle side walls 43, with the handle side walls 43 receiving the tool plate body 11 therebetween, with a fastener rod 35 received through the side walls 43 and through a body slot 34 directed between the third step flange 18 and the body bottom end wall 17.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A siding alignment tool, comprising,
a tool plate body, having a first side wall spaced from a second side wall in a parallel coextensive relationship defining a predetermined thickness of said tool plate body, wherein the tool plate body includes a bottom end wall, and
a first end wall extending at an obtuse included angle relative to and from the bottom end wall, with a first step flange orthogonally intersecting the first end wall at an uppermost distal end of the first end wall, and
a second end wall arranged in a parallel relationship relative to the first end wall and extends orthogonally from the first step flange terminating in a second step flange orthogonally intersecting the second end wall, and
a graduated scale extending from the second step flange to the first step flange, and a third end wall extending from the bottom end wall at an obtuse included angle relative to the bottom end wall, with the third end wall terminating in a third step flange orthogonally intersecting the third end wall, and a fourth end wall parallel to and offset relative to the third end wall extending orthogonally from the third step flange and extending along the tool plate body terminating in a fourth step flange, wherein the fourth step flange includes a second graduated scale extending from the fourth step flange to the third step flange, wherein the second graduated scale is of a second length and the graduated scale is of a first length, with the second length greater than the first length.

2. A tool as set forth in claim 1 including a head plate projecting from the second step flange and the fourth step flange extending between the second step flange and the fourth step flange, and a spring clip member mounted to the head plate for securement of the tool plate body.

3. A tool as set forth in claim 2 including a bottom end wall cavity extending into the tool plate body from the bottom end wall, with the bottom end wall cavity including a cavity entrance, and a plurality of spring plates arranged in facing relationship relative to one another positioned within the bottom end wall cavity in adjacency to the cavity entrance, and a scribe body arranged for reception within the bottom end wall cavity and for securement between the spring plates, with the scribe body including a body first end terminating in a pointed projection, and the scribe body having a body second end having a head member arranged for abutment with the body bottom end wall when the scribe body is directed into the bottom end wall cavity.

* * * * *